May 11, 1943.  R. TONER  2,319,170
OYSTER SPAT COLLECTOR
Filed July 5, 1941
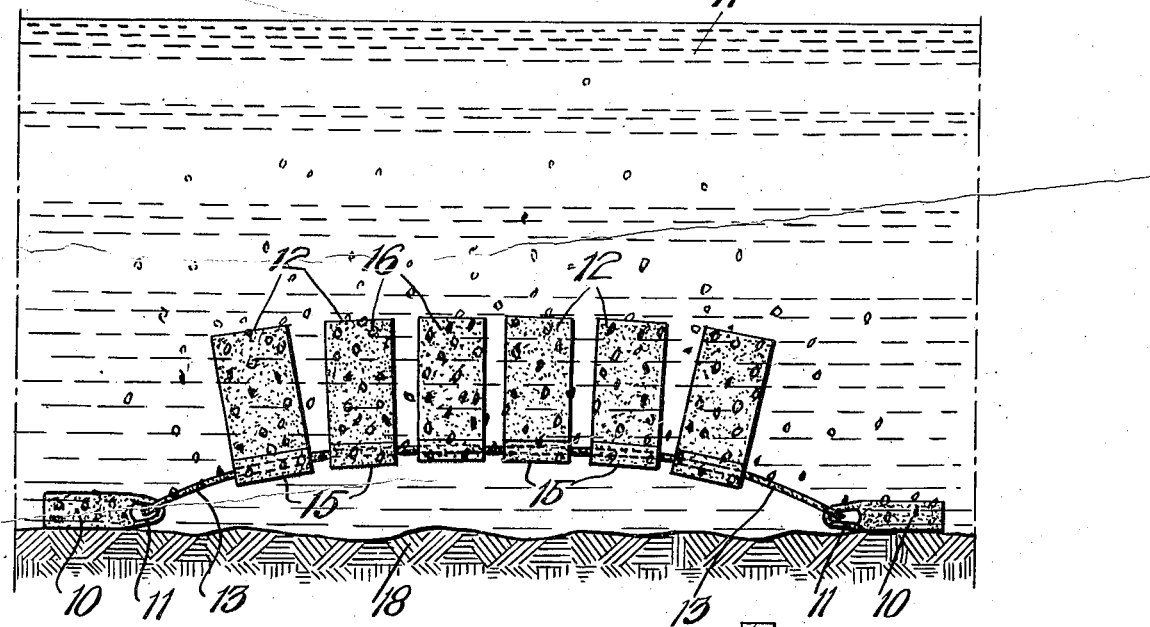
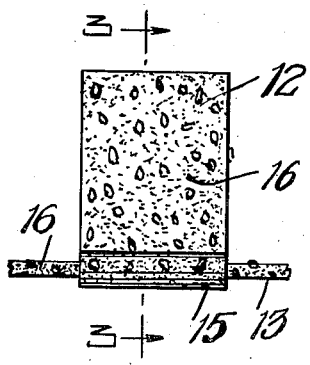
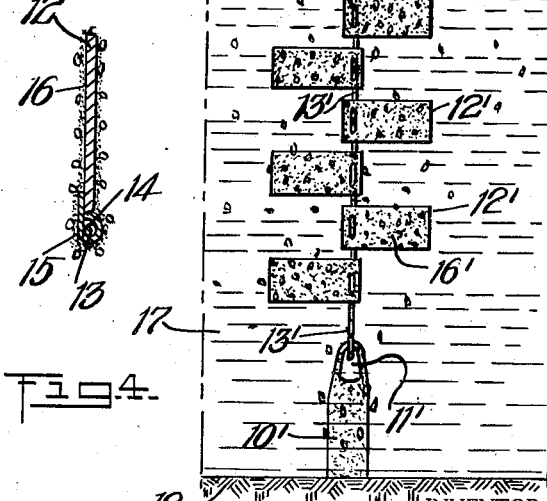
INVENTOR.
ROYAL TONER
BY George Schlatt
ATTORNEY Patented May 11, 1943

2,319,170

UNITED STATES PATENT OFFICE 2,319,170

OYSTER SPAT COLLECTOR

Royal Toner, Garden City, N. Y.

Application July 5, 1941, Serial No. 401,221

3 Claims. (Cl. 119—4)

This invention relates to improvements in oyster spat collector.

Objects

Among the principal objects which the present invention has in view are: to provide means for the collecting of oyster spat; to be enabled to protect oyster spat from its common enemies; to be enabled to remove any possibility of destruction of oyster spat; to provide an apparatus for collecting oyster spat slightly above the sea bottom; to provide an apparatus with a coating whereby oyster spat will cling thereto until a thin shell forms on the spat; to provide an apparatus having a plurality of coated members for attracting oyster spat; to provide means for anchoring the apparatus under the surface of the water; to be enabled to easily remove the apparatus from the water; to secure simplicity of construction, operation and method for collecting oyster spat; and to obtain other advantages and results as may be brought out in the following description.

Drawing

Figure 1 is a schematic view illustrating the adaptability of my improved apparatus in a body of water for collecting oyster spat;

Figure 2 is a front elevation of one member of the means employed in the collecting of the oyster spat;

Figure 3 is a vertical sectional view shown as taken on line 3—3 of Figure 2; and Figure 4 is a view similar to Figure 1 and showing a slightly modified form of apparatus employed in the collecting of oyster spat.

Description

The present invention is particularly directed to the collecting of spat given off from oysters during the spawning season. Heretofore, and as is known, the spat from oysters floats upwardly to the top surface of the waters in what commonly is termed the oyster beds. This spat after it has floated to the surface of the water gradually descends to the bottom of the sea. The most commonplace method of collecting spat after it has descended to the bottom is the use of old oyster shells with which the spat comes in contact and where it remains until a shell starts forming. These old shells with the oyster seeds forming thereon periodically are removed from the sea bottom and the seeds removed therefrom. However, though this method has long been in use, considerable loss of spat over long years has been encountered due to the spat being destroyed by common undersea enemies, such as starfishes, drills, drumfish and so forth. Likewise, very often the spat become lodged in the sea bottom and are rendered useless and undesirable by worms getting into the soft shells forming on the spat. Many other disadvantages in the collecting of oyster spat by present day methods are encountered and it is to this end the present invention is more particularly directed whereby loss of oyster spat is greatly minimized. Also, as is known to those well versed in the art, much depends on the natural conditions for collecting the spat and the cultch on which the spat will settle.

In carrying out the invention and referring more particularly to Figures 1 to 3 inclusive, there is illustrated for purposes of description a means for collecting oyster spat and recovering much which heretofore has been considered a total loss due to the reasons set forth in the preceding paragraph. Such means preferably may be in the form of a pair of weight members and will be referred to as anchor members 10. Said anchor members may be of any material, such as lead, iron, brick or the like, and may be of any suitable shape, such as, square, round or rectangular. These anchor members conveniently may be provided at either or both ends with eyelets 11. In the general construction or assembly of the apparatus a plurality of members of suitable material, preferably of buoyant character, such as wood shingles or the like 12 may be suitably connected in spaced relationship with respect to each other as by a length of wire or sisal cord 13 or the like with the outer ends made fast to the eyelets 11 of the anchor members 10. The members 12 for clarity and for purposes of a full disclosure will be referred to as wood shingles and due to the lightness in weight, especially when coated as hereinafter related, will have a tendency to float upwardly in a body of water and accordingly will more or less act as a buoy when the assembled apparatus is in use. As previously stated the plurality of members 12 are suitably connected with respect to each other as by the wire or sisal cord 13. Such connection may be of any desired method and no restriction is made to the present showing of the several figures of the drawing. As shown the wire or cord may be passed through openings 14 provided in extensions 15 in any convenient manner, with the said extensions attached to one edge of the individual shingles as clearly shown in Figures 2 and 3. In passing it may be said that any number of singles 12 can be utilized in the assembly of a complete apparatus depending on the area of an oyster bed. In practice a plurality of assembled apparatus may be put in use in the oyster bed area for collecting the spat eruded from oysters.

As is known to those well versed in the art of collecting oyster spat, cultch must be provided on which the spat will cling until the soft shell forms and the young oyster seed are created. The means in the present case conveniently may be constituted by coating each member or shingle with a suitable preparation of sand cement and lime of equal proportions. This coating 16 is applied and allowed to dry sufficiently before placing the assembled apparatus in the water. Furthermore, if desired, the wire or cord 13 and the anchor members 10 may be coated at the same time. The lime in the preparation will have a tendency to draw towards it the spat floating in the water and there is no objection to the spat attaching itself to the several members of the assembled apparatus. The sand cement will give ample cultch for the spat and in due time a thin shell will form around the spat without causing it to become released from the coated surfaces of the shingles 12, the anchors 10 and the wire or cord 13.

In operation the assembled and coated apparatus for the oyster spat collector is lowered into a body of water 17, known as the oyster bed and due to its anchors 10 will sink until it reaches the seat bed or bottom 18. Due to the anchors being at the respective outer ends of the apparatus, the anchors will lie on the seat bottom flatwise with the connected shingles 12, due to the buoyancy, bowed upwardly approximately twelve inches from the bottom. With the coated shingles bowed upwardly in the manner stated the oyster spat floating in the water will accordingly be attracted thereto and attach itself thereon. These spat collectors may be raised from time to time as desired for removing the collected spat and then again lowered into the water.

In Figure 4 there is shown a slightly modified form of construction of oyster spat collector in which there is provided a single anchor 10' which in practice rests on the sea bottom 18. This anchor may be provided with an eyelet 11' to which may be conveniently attached a wire or cord 13'. However it is preferable that the apparatus extend in an upright position and a bottle buoy or other buoy 19 may be secured to the wire or cord at the end opposite to the anchor 10'. This buoy accordingly will protrude above the water line and will act as an indentification for the particular oyster farmer as well as to assist in keeping the apparatus in an upright position. To the wire or cord 13' and as set forth in Figures 1 to 3 inclusive, suitable means are attached for collecting the oyster spat. Said means preferably may be wood shingles 12' or other members such as previously described, arranged in staggered relationship with respect to each other and extending outwardly and sidewise from the wire or cord. Means for holding the shingles secure to the wire or cord may be similar to that shown in the preferred construction. However, it is well within the scope of the invention to secure the shingles directly to the wire or cord by punching a pair of holes suitably spaced from each end of the shingles and then passing the wire or cord inwardly through one hole and then outwardly through the other hole thereby securely holding the shingle in place against sliding and displacement. Also, due to the lightness in weight of the said shingles they will act as buoys and will remain in an upright position when in the body of water 17.

As in the preferred showing the apparatus as shown in Figure 4 may be coated with the same preparation of sand cement and lime of equal proportions. This coating may be applied to the assembled members and allowed to dry before placing in the water. This coating 16' accordingly will act as the cultch for the oyster spat which may be floating in the water. The apparatus may be raised from time to time from the water and the thinly shelled spat easily removed from the several members for further treatment and the apparatus again lowered in the water without the necessity of again coating it.

Obviously detail changes and modifications may be made in the construction and use of my improved oyster spat collector without departing from the spirit or scope of the invention, and I do not wish to be understood as limiting myself to the exact construction or operation shown or described except as set forth in the following claims.

I claim:

1. An oyster spat collector of the character described comprising a plurality of flat members each having a substantially straight edge, said members being adapted to be placed in a body of water and having a coating enabling spat to attach itself to the same, cord-like means longitudinal of each said straight edge, each said member being secured to said means and the member being held next the ends of said edge for preventing said edge from twisting away from said means, said members being situated successively along and projecting laterally from said means, and anchor means for retaining said members submerged.

2. An oyster spat collector of the character described comprising a plurality of flat members each having a substantially straight edge, said members being adapted to be placed in a body of water and having a coating enabling spat to attach itself to the same, cord-like means longitudinal of each said straight edge, each said member being secured to said means and the member being held next the ends of said edge for preventing said edge from twisting away from said means, said members being situated successively along and all projecting laterally from the same side of said means, and anchor means for retaining said members submerged.

3. An oyster spat collector of the character described comprising a plurality of flat members each having a substantially straight edge, said members being adapted to be placed in a body of water and having a coating enabling spat to attach itself to the same, cord-like means longitudinal of each said straight edge, each said member being secured to said means and the member being held next the ends of said edge for preventing said edge from twisting away from said means, said members being situated successively along and alternate ones projecting oppositely from said means, and anchor means for retaining said members submerged.

ROYAL TONER.